United States Patent
Jang et al.

(10) Patent No.: US 8,634,725 B2
(45) Date of Patent: Jan. 21, 2014

(54) METHOD AND APPARATUS FOR TRANSMITTING DATA USING VISIBLE LIGHT COMMUNICATION

(75) Inventors: Il-Soon Jang, Daejeon (KR); Dae Ho Kim, Daejeon (KR); Sang-Kyu Lim, Daejeon (KR); You Jin Kim, Daejeon (KR); Tae-Gyu Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 119 days.

(21) Appl. No.: 13/269,197

(22) Filed: Oct. 7, 2011

(65) Prior Publication Data

US 2012/0087677 A1    Apr. 12, 2012

(30) Foreign Application Priority Data

Oct. 7, 2010   (KR) .................. 10-2010-0097913
Jun. 14, 2011  (KR) .................. 10-2011-0057662

(51) Int. Cl.
*H04B 10/00*   (2013.01)
*H04B 10/04*   (2011.01)
*H04B 10/12*   (2011.01)

(52) U.S. Cl.
USPC ..................... 398/172; 398/118; 398/182

(58) Field of Classification Search
None
See application file for complete search history.

(56) References Cited

U.S. PATENT DOCUMENTS

| 2007/0058987 A1* | 3/2007 | Suzuki | 398/183 |
| 2010/0034540 A1* | 2/2010 | Togashi | 398/118 |
| 2011/0002695 A1 | 1/2011 | Choi et al. | |

FOREIGN PATENT DOCUMENTS

KR   1020090090525   8/2009

* cited by examiner

*Primary Examiner* — Leslie Pascal
*Assistant Examiner* — Casey Kretzer
(74) *Attorney, Agent, or Firm* — Nelson Mullins Riley & Scarborough LLP

(57) ABSTRACT

A transmitting apparatus using visible light communication generates a light source control signal from color information representing additional information and transmits additional information with a color of light that is emitted by a light source by controlling an on/off time of a plurality of LEDs according to the light source control signal. Therefore, a user can intuitively know additional information from a color of light that is emitted by the light source.

9 Claims, 12 Drawing Sheets

FIG. 2

| Data frame | CVD frame | Data frame |
|---|---|---|

METHOD AND APPARATUS FOR TRANSMITTING DATA USING VISIBLE LIGHT COMMUNICATION

CROSS-REFERENCE TO RELATED APPLICATION

This application claims priority to and the benefit of Korean Patent Application No. 10-2010-0097913 and 10-2011-0057662 filed in the Korean Intellectual Property Office on Oct. 7, 2010 and Jun. 14, 2011, the entire contents of which are incorporated herein by reference.

BACKGROUND OF THE INVENTION (a) Field of the Invention

The present invention relates to a method and apparatus for transmitting data using visible light communication. More particularly, the present invention relates to a transmitting method and apparatus for providing intuitive information using visible light communication.

(b) Description of the Related Art

Nowadays, as a lighting device using a light emitting diode (LED) as a light source is widely used, visible light communication (VLC) technology that can communicate with an LED lighting device has been introduced.

The VLC technology is communication technology that loads data at light of a visible light wavelength band in which a person can recognize with eyes and that transmits the data by wireless. The VLC can provide various intuitive information to a user using characteristics of visibility in addition to a communication function. For example, VLC technology using LED lighting can intuitively provide information on a present communication state, a data transmission speed, a data transmission state, and a size of data that is transmitted or to be transmitted to a user using various colors. In this case, VLC technology using LED lighting transmits intuitive information through a color-visibility-dimming (CVD) frame at a segment that does not transmit data between data frames. The CVD frame includes a red pattern, a green pattern, and a blue pattern for representing a specific color. That is, a user can intuitively know a specific color by transmitting a red pattern, a green pattern, and a blue pattern through the CVD frame.

In general, in VLC using LED lighting, by changing a voltage that is applied to a red LED, a green LED, and a blue LED according to a red pattern, a green pattern, and a blue pattern, brightness of a red LED light source, a green LED light source, and a blue LED light source becomes different, whereby a method of representing a specific color is used. However, in such a method, in order to supply a voltage that is applied to the LED according to a color to express, there is a problem that a circuit for supplying various power is additionally necessary and power consumption increases according to supply of various power to the LED.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for transmitting data using visible light communication having advantages of providing intuitive information through various colors without changing a voltage that is applied to an LED light source.

An exemplary embodiment of the present invention provides a method of transmitting data in a transmitting apparatus using visible light communication. The method includes generating a light source control signal from color information representing additional information; controlling an on/off time of a light source according to the light source control signal; and transmitting the additional information with a color of light that is emitted from the light source.

The light source may include a plurality of light emitting diodes (LED), and the plurality of LEDs may include at least a red LED, a green LED, and a blue LED.

The generating of a light source control signal may include generating light source control signals of the red LED, the green LED, and the blue LED from ratios of red, green, and blue, respectively, for expressing the color.

The generating of light source control signals of the red LED, the green LED, and the blue LED may include receiving a color index and a luminance index of the color; generating pattern indexes of the red LED, the green LED, and the blue LED using the color index and the luminance index; and generating light source control signals of the red LED, the green LED, and the blue LED according to the pattern indexes of the red LED, the green LED, and the blue LED.

The generating of a pattern index may include determining a pattern index of an LED that emits light of a color having a largest ratio from ratios of red, green, and blue for expressing the color according to the luminance index; and determining pattern indexes of the remaining LEDs according to the ratio of the red, the green, and the blue.

Voltages that turn on the red LED, the green LED, and the blue LED according to light source control signals of the red LED, the green LED, and the blue LED may be equal.

The method may further include: receiving transmission data from an upper-level layer; generating a modulation signal by modulating the transmission data; and controlling the light source according to the modulation signal.

Another embodiment of the present invention provides a transmitting apparatus using visible light communication. The transmitting apparatus includes a light source, a color processor, and a light source driver. The color processor generates a light source control signal from color information representing additional information. The light source driver controls an on/off time of a plurality of LEDs according to the light source control signal and transmits additional information with a color of light that is emitted by the light source.

The light source includes a plurality of LEDs, and the plurality of LEDs include at least a red LED, a green LED, and a blue LED.

The color processor may include a color generator that generates pattern indexes of the red LED, the green LED, and the blue LED using a color index and a luminance index representing a color corresponding to the additional information that is transferred from an upper-level layer, and a pattern generator that generates light source control signals of the red LED, the green LED, and the blue LED according to the pattern indexes of the red LED, the green LED, and the blue LED, respectively.

The color generator may determine a pattern index of an LED that emits light of a color having a largest occupying ratio according to the luminance index in order to express a color representing the additional information among red, green, and blue and determine pattern indexes of the remaining LEDs according to an occupying ratio in order to express a color corresponding to the additional information.

Voltages that turn on the red LED, the green LED, and the blue LED according to a light source control signal of the red LED, the green LED, and the blue LED may be equal.

BRIEF DESCRIPTION OF THE DRAWINGS

FIG. 2 is a diagram illustrating an example of a communication frame of a communication apparatus using visible light communication according to an exemplary embodiment of the present invention.

DETAILED DESCRIPTION OF THE EMBODIMENTS

Figure 1:
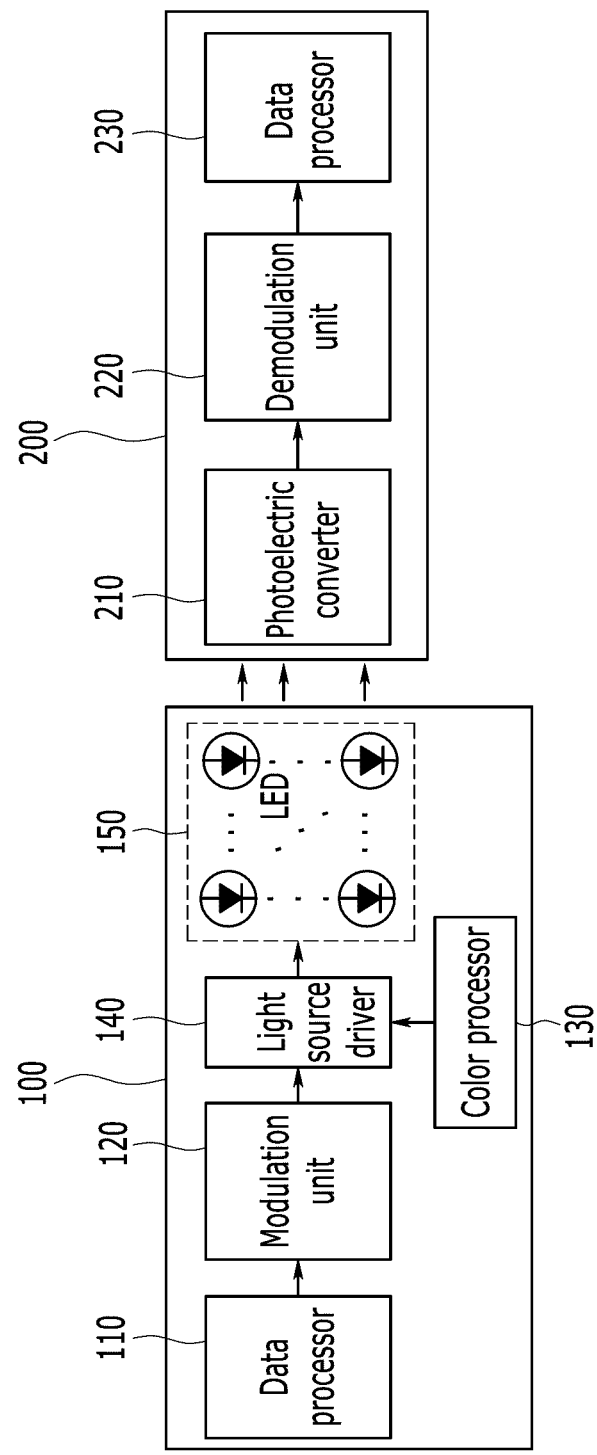
FIG. 1 is a diagram illustrating a communication apparatus using visible light communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising", will be understood to imply the inclusion of stated elements but not the exclusion of any other elements.

Hereinafter, a method and apparatus for transmitting/receiving data using visible light communication according to an exemplary embodiment of the present invention will be described in detail with reference to the drawings.

FIG. 1 is a diagram illustrating a communication apparatus using visible light communication according to an exemplary embodiment of the present invention.

Referring to FIG. 1, a communication apparatus using visible light communication includes a transmitting apparatus 100 and a receiving apparatus 200.

The transmitting apparatus 100 includes a data processor 110, a modulation unit 120, a color processor 130, a light source driver 140, and a light source 150. Further, the receiving apparatus 200 includes a photoelectric converter 210, a demodulation unit 220, and a data processor 230.

In the transmitting apparatus 100, the data processor 110 transfers transmission data to transmit from an upper-level layer to the modulation unit 120.

The modulation unit 120 modulates transmission data using a predetermined modulation method and transfers the modulated transmission data to the light source driver 140. The modulation unit 120 may use a modulation method such as on-off keying, pulse position modulation, orthogonal frequency division multiplexing, and pulse amplitude modulation.

In order to provide additional information through the light source 150 and to represent a color corresponding to additional information, the color processor 130 generates a light source driving signal according to a color representing additional information and transfers the light source driving signal to the light source driver 140. Additional information may include at least one of information on, for example, a present communication state, a data transmission speed, a data transmission state, and a size of data that are transmitted or to be transmitted. Colors representing each of such additional information are determined.

The light source 150 includes a plurality of light emitting diodes (LED). A plurality of LEDs include a red LED, a green LED, and a blue LED. Further, a plurality of LEDs may further include a white LED.

The light source driver 140 controls a turn-on state and a turn-off state of a plurality of LEDs according to a modulation signal of the modulation unit 120.

The light source 150 is turned on according to the control of the light source driver 140 to generate and radiate a visible light signal.

Further, the light source driver 140 controls a turn-on state and a turn-off state of a plurality of LEDs according to a light source driving signal of the color processor 130. Therefore, a color is expressed by a combination of light that is emitted by a plurality of LEDs, and a user can know intuitively additional information from a color that is expressed by a combination of light that is emitted by a plurality of LEDs.

In the receiving apparatus 200, the photoelectric converter 210 senses a visible light signal through a lens and a filter (not shown) and converts the visible light signal to an electric signal. A photo-diode or an image sensor can be used as the photoelectric converter 210.

The demodulation unit 220 demodulates an electric signal into transmission data.

The data processor 230 processes transmission data to correspond to a corresponding application.

Figure 2:
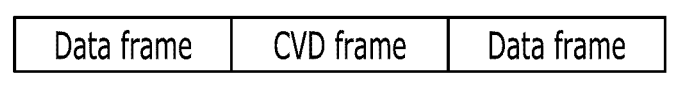

FIG. 2 is a diagram illustrating an example of a communication frame of a communication apparatus using visible light communication according to an exemplary embodiment of the present invention.

Referring to FIG. 2, the communication frame of the communication apparatus using visible light communication includes a color-visibility-dimming (CVD) frame between data frames.

The data frame includes transmission data, and the CVD frame includes color information. That is, a user can intuitively know additional information through a color that is expressed with a combination of light of a plurality of LEDs while a CVD frame is transmitted.

Hereinafter, a method in which the transmitting apparatus 100 according to an exemplary embodiment of the present invention transmits additional information will be described in detail with reference to FIGS. 3 to 6.

Figure 3:
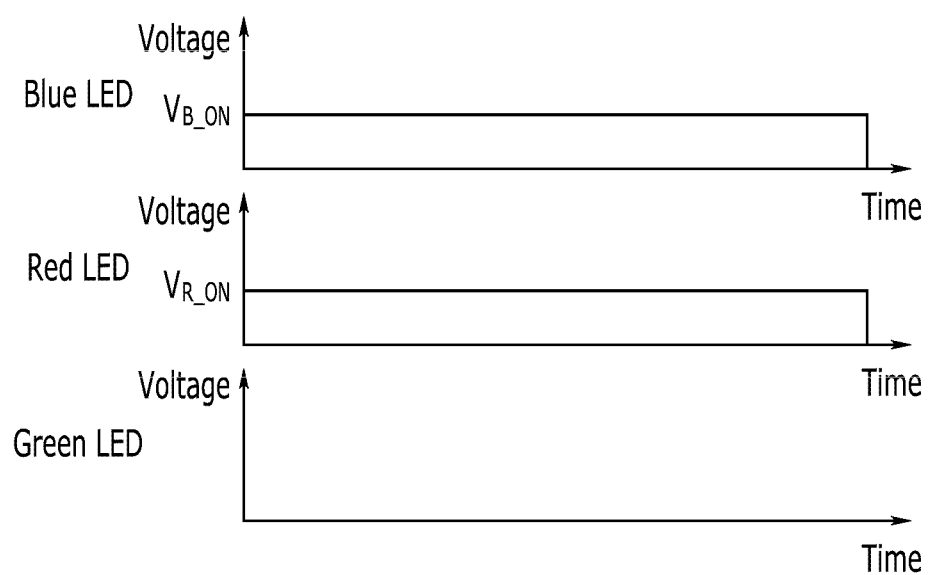
FIGS. 3 and 4 each are diagrams illustrating a method of transmitting additional information in conventional visible light communication.
Figure 4:
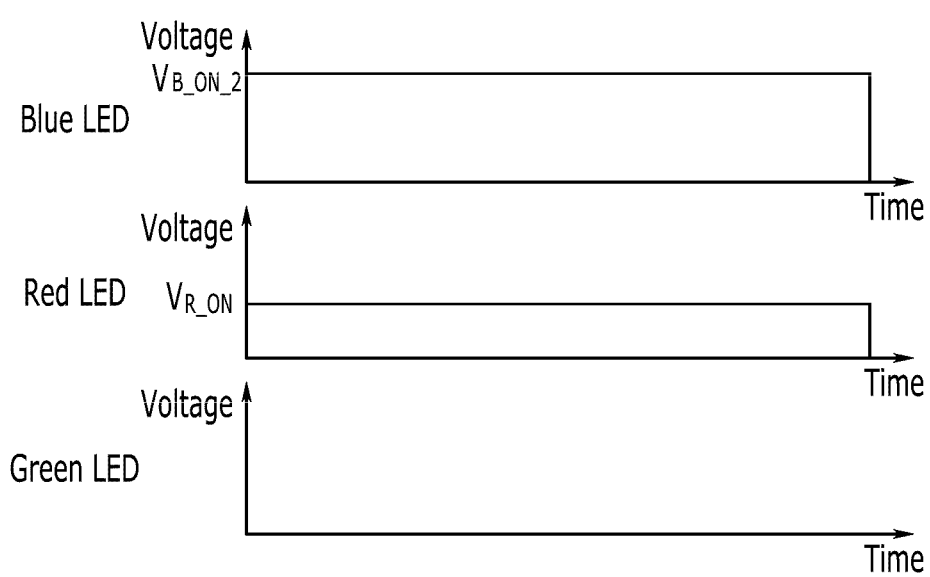
Figure 5:
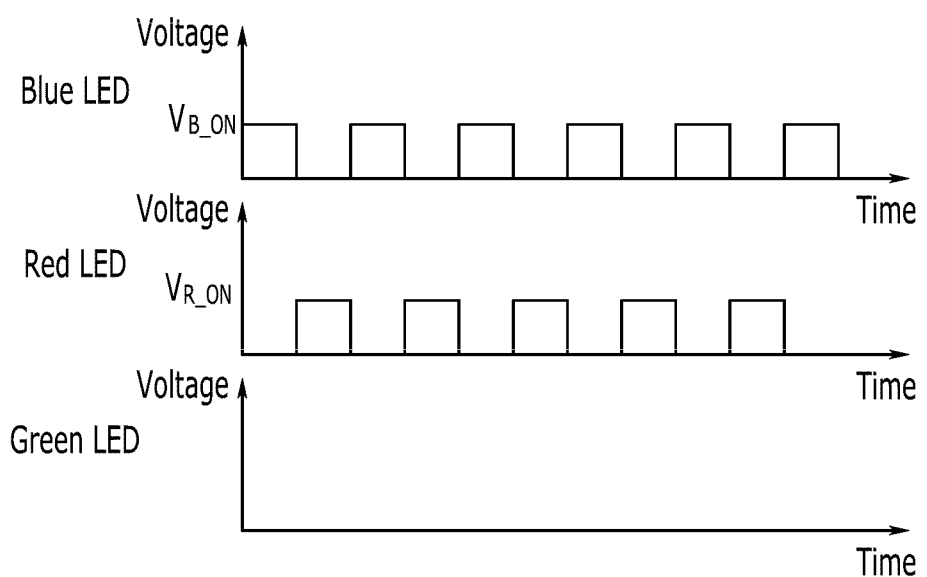
FIGS. 5 and 6 each are diagrams illustrating a method of transmitting additional information in a transmitting apparatus using visible light communication according to an exemplary embodiment of the present invention.
Figure 6:
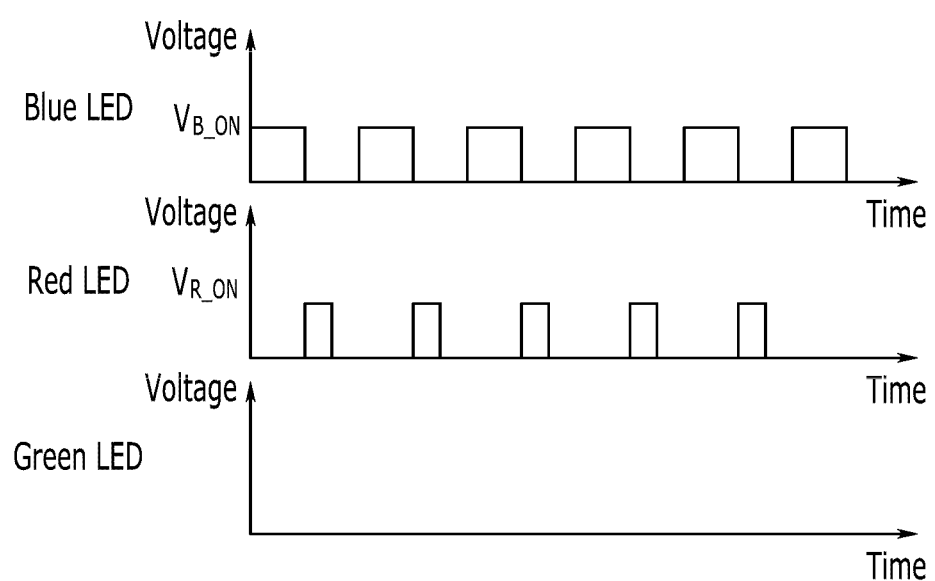

FIGS. 3 and 4 each are diagrams illustrating a method of transmitting additional information in conventional visible light communication, and FIGS. 5 and 6 each are diagrams illustrating a method in which a transmitting apparatus using visible light communication according to an exemplary embodiment of the present invention transmits additional information.

Referring to FIG. 3, a transmitting apparatus using conventional visible light communication expresses pink by applying a voltage $V_{R\_ON}$ and a voltage $V_{B\_ON}$ to a red LED and a blue LED, respectively, and not applying a voltage to a green LED.

Further, referring to FIG. 4, the transmitting apparatus using conventional visible light communication expresses violet by applying a voltage $V_{R\_ON}$ and a voltage $V_{B\_ON\_2}$ to a red LED and a blue LED, respectively, and not applying a voltage to a green LED. In this case, the voltage $V_{B\_ON\_2}$ is a voltage corresponding to a voltage $2*V_{B\_ON}$.

In this way, the transmitting apparatus using conventional visible light communication expresses different colors by changing voltages that are applied to a red LED, a green LED, and a blue LED, and provides additional information corresponding to each color to the user.

Alternatively, referring to FIGS. 5 and 6, the transmitting apparatus 100 using visible light communication according to an exemplary embodiment of the present invention expresses a corresponding color by controlling an ON/OFF time of a red LED, a green LED, and a blue LED without a magnitude change of a voltage that is applied to the red LED, the green LED, and the blue LED.

Referring to FIG. 5, the transmitting apparatus 100 using visible light communication according to an exemplary embodiment of the present invention expresses pink by equally setting an on-time of a red LED and an on-time of a blue LED and turning off a green LED without a magnitude change of a voltage $V_{B\_ON}$ that is applied a red LED and a blue LED. In this case, the red LED and the blue LED may be simultaneously or alternately turned on.

Further, referring to FIG. 6, the transmitting apparatus 100 using visible light communication according to an exemplary embodiment of the present invention sets an on-time of a blue LED to the double of an on-time of a red LED and turns off a green LED, thereby expressing violet.

Figure 7:
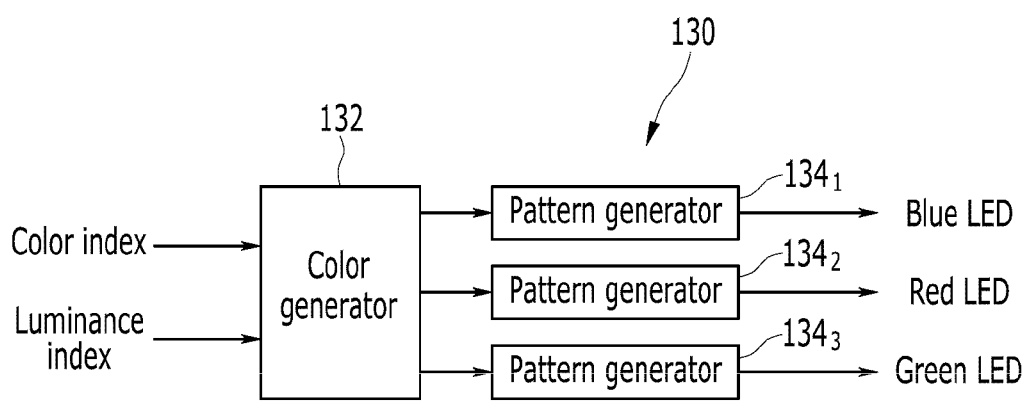
FIG. 7 is a diagram illustrating a color processor that is shown in FIG. 1.

FIG. 7 is a diagram illustrating a color processor that is shown in FIG. 1.

Referring to FIG. 7, the color processor 130 includes a color generator 132 and a plurality of pattern generators $134_1$-$134_3$.

The color generator 132 receives a color index and a luminance index of a color to transmit from an upper-level layer, generates pattern indexes representing brightness of a red LED, a green LED, and a blue LED using the color index and the luminance index and transfers the pattern indexes to the pattern generators $134_1$-$134_3$. For example, when numerals and colors are mapped with one to one with a method in which blue is mapped to 1, red is mapped to 2, green is mapped to 3, pink is mapped to 4, violet is mapped to 5, and orange is mapped to 7, the color index may be a numeral. The luminance index is an element that adjusts brightness of an LED of the same color.

The pattern generators $134_1$-$134_3$ each generate light source driving signals of a red LED, a green LED, and a blue LED according to pattern indexes that receive from the color generator 132 and transfer the light source driving signals to the light source driver 140. The light source driving signal is a signal that turns on/off a corresponding LED.

That is, the pattern generators $134_1$-$134_3$ apply the same voltage to a red LED, a green LED, and a blue LED and control an on/off time of the red LED, the green LED, and the blue LED according to pattern indexes that receive from the color generator 132, thereby expressing various colors.

The number of patterns of a light source driving signal of each of a red LED, a green LED, and a blue LED is determined according to the number of pattern indexes. For example, when a pattern index corresponding to a red LED is set to 8 bits (0 to 255), brightness of 256 is generated by the red LED.

Figure 8:
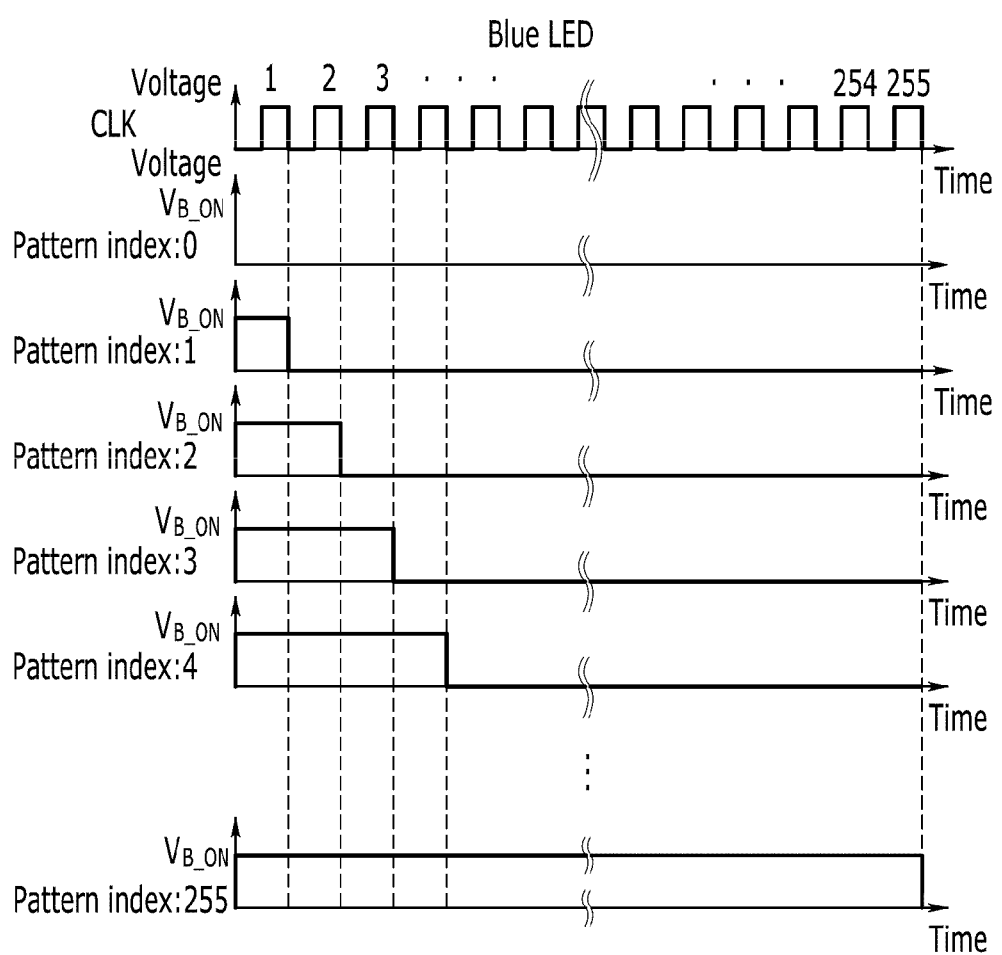
FIG. 8 is a diagram illustrating an example of a light source driving signal of an LED for transmitting color information according to an exemplary embodiment of the present invention.

FIG. 8 is a diagram illustrating an example of a light source driving signal of an LED for transmitting color information according to an exemplary embodiment of the present invention.

FIG. 8 represents a pattern of a light source driving signal according to 256 pattern indexes in a blue LED.

Referring to FIG. 8, the pattern generator $134_3$ corresponding to a blue LED generates 256 light source driving signals according to pattern indexes of 0-255. That is, the pattern generator $134_3$ generates 256 light source driving signals by increasing a turn-on time of a blue LED by one clock using 255 clocks as one cycle.

For example, when light source driving signals of a red LED and a blue LED have a pattern of FIG. 8, in order to express violet, the color generator 132 selects a pattern index of a blue LED to 128, a pattern index of a red LED to 64, and a pattern index of a green LED to 0, and the pattern generators $134_1$-$134_3$ generate light source driving signals according to pattern indexes of 128, 64, and 0 and transfer the light source driving signals to the light source driver 140.

A light source driving signal may have different patterns even in the same pattern index.

Figure 9:
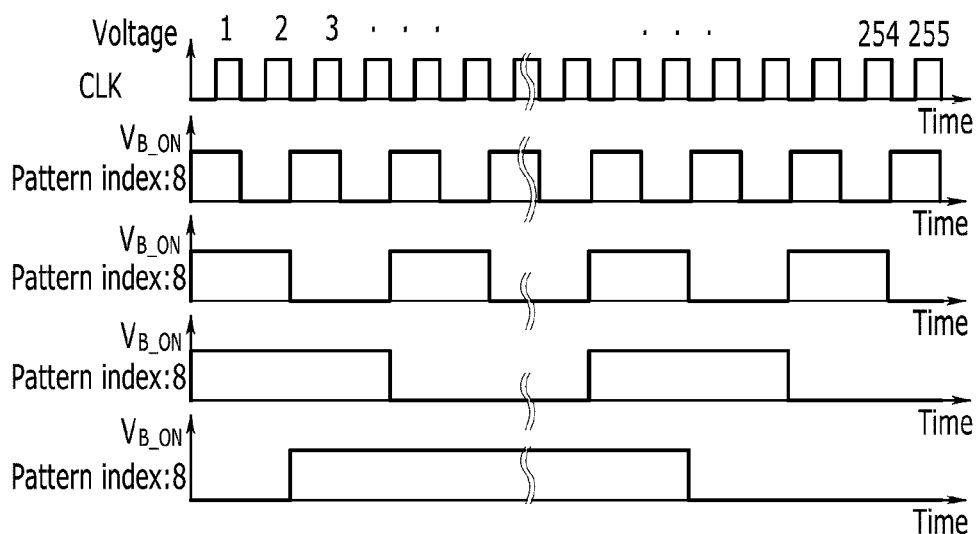
FIG. 9 is a diagram illustrating an example of a light source driving signal according to the same pattern index.

FIG. 9 is a diagram illustrating an example of a light source driving signal according to the same pattern index.

Referring to FIG. 9, a plurality of light source driving signals may generate with one pattern index, for example, a pattern index of 8 that is shown in FIG. 8. In this case, in a plurality of light source driving signals, turn-on time periods of an LED light source are equal in a predetermined cycle.

That is, the pattern generators $134_1$-$134_3$ generate at least one light source driving signal in which turn-on time periods of an LED light source are equal in a predetermined cycle in any one pattern index and select one of the at least one light source driving signal as a light source driving signal corresponding to a corresponding pattern index.

The luminance index is an element that adjusts brightness of an LED of the same color. The color is determined by a ratio of an on/off time of an LED for a predetermined time period, but luminance is determined by an on-time of an LED for a predetermined time period.

Figure 10A:
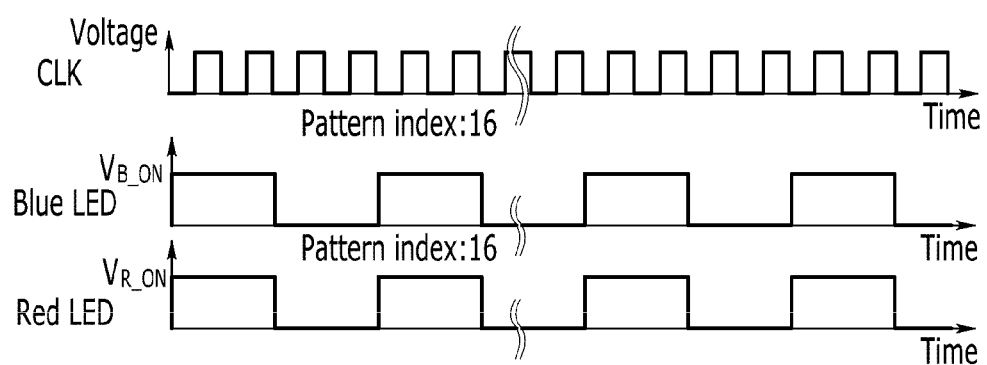
FIGS. 10A and 10B are diagrams illustrating an example of representing the same color in different pattern indexes.
Figure 10B:
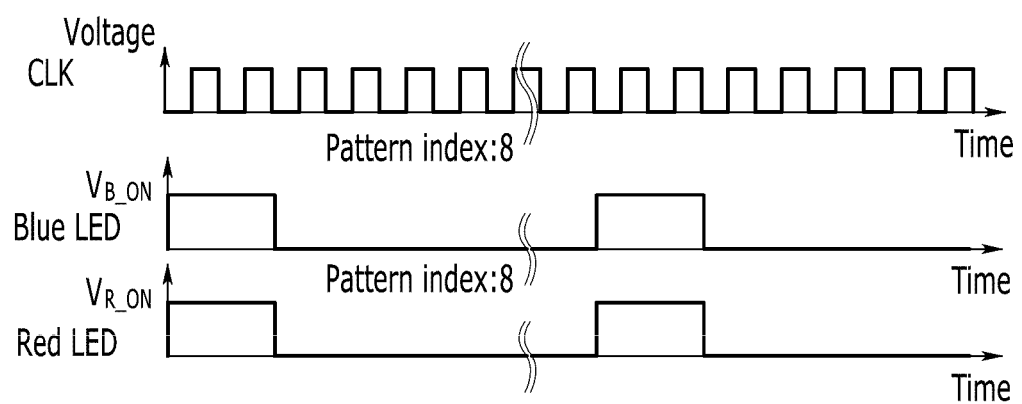

FIGS. 10A and 10B are diagrams illustrating an example of representing the same color in different pattern indexes.

FIG. 10A illustrates a light source driving signal of a red LED and a blue LED when a pattern index is 16, and FIG. 10B illustrates a light source driving signal of a red LED and a blue LED when a pattern index is 8.

When a light source driving signal that is shown in FIGS. 10A and 10B is generated according to pattern indexes of 16 and 8, in the light source driving signal that is shown in FIGS. 10A and 10B, on/off ratios of a red LED and a blue LED are equal for a predetermined time period and thus the light source driving signal represents the same color. In this case, an on-time of a red LED and a blue LED according to the light source driving signal that is shown in FIG. 10A is longer than an on-time of a red LED and a blue LED according to the light source driving signal that is shown in FIG. 10B. That is, luminance of a light source according to the light source driving signal that is shown in FIG. 10A is larger than luminance of a light source according to the light source driving signal that is shown in FIG. 10B.

In this way, because the same color can be expressed with different pattern indexes, the color generator 132 according to an exemplary embodiment of the present invention determines pattern indexes of a red LED, a green LED, and a blue LED using a color index and a luminance index.

Figure 11:
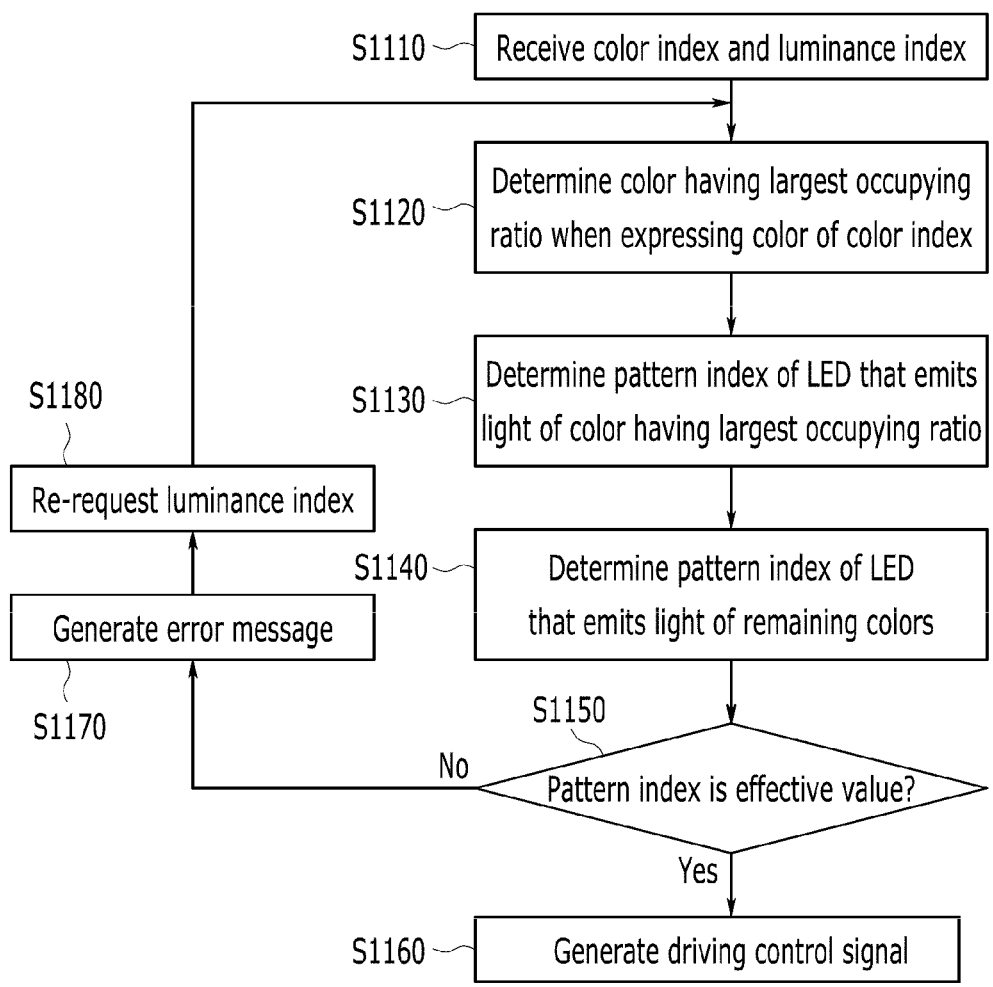
FIG. 11 is a flowchart illustrating a method of determining a pattern index in a color generator according to an exemplary embodiment of the present invention.

FIG. 11 is a flowchart illustrating a method of determining a pattern index in a color generator according to an exemplary embodiment of the present invention.

Referring to FIG. 11, the color generator 132 receives a color index and a luminance index of a color to transmit from an upper-level layer (S1110).

The color generator 132 determines a color having a largest occupying ratio among red, green, and blue that express a color corresponding to a color index (S1120) and determines a pattern index of an LED that emits light of a color having a largest occupying ratio according to a luminance index that receives from an upper-level layer (S1130).

Next, the color generator 132 determines a pattern index of an LED that emits light of the remaining colors according to a ratio of red, green, and blue that express a color corresponding to a color index (S1140).

The color generator 132 determines whether a pattern index of a red LED, a green LED, and a blue LED is an effective value (S1150), and if a pattern index of a red LED, a green LED, and a blue LED is an effective value, the color generator 132 transfers pattern indexes of the red LED, the green LED, and the blue LED to the pattern generators $134_1$-$134_3$, respectively.

The pattern generators $134_1$-$134_3$ generate light source driving signals to correspond to pattern indexes of a red LED, a green LED, and a blue LED and output the light source driving signals to the light source driver 140 (S1160).

If a pattern index of a red LED, a green LED, and a blue LED is no effective value, the color generator 132 generates an error message (S1170), and re-requests a luminance index from an upper-level layer (S1180).

For example, when a luminance index has a value of 0-255, in order to represent pink, the upper-level layer transmits a color index 4 and a luminance index 16 of pink to the color generator 132. In pink, a ratio of red, blue, and green is set to 1:1:0. In this case, because ratios of red and blue are equal, the color generator 132 may randomly set a color having a largest ratio among ratios of red, green, and blue that express pink to blue. The color generator 132 sets a pattern index of a blue LED that emits light of blue according to a luminance index 16 to 16 and sets pattern indexes of a red LED and a green LED that emit light of red and green according to a ratio of red, blue, and green to 16 and 0, respectively.

The color generator 132 transfers pattern indexes of a red LED, a green LED, and a blue LED to the pattern generators $134_1$-$134_3$, and the pattern generators $134_1$ and $134_3$ generate a light source driving signal that sustains a red LED and a blue LED in an on-state at any 16 clock segments of 255 clocks according to a pattern index 16 and output the light source driving signal to the light source driver 140.

In another exemplary embodiment, the color generator 132 receives a color index 5 and a luminance index 16 of violet from an upper-level layer. In violet, because a ratio of red, blue, and green is expressed with 1:2:0, the color generator 132 determines a color having a largest ratio as blue. The color generator 132 sets a pattern index of a blue LED that emits light of blue according to a luminance index 16 to 16 and sets pattern indexes of a red LED and a green LED that emit red light and green light according to ratios of red, blue, and green to 8 and 0, respectively. Alternatively, when a luminance index is 128, the color generator 132 may set a pattern index of a blue LED that emits blue light to 128 according to a luminance index 128 and set pattern indexes of a red LED and a green LED that emit red light and green light according to ratios of red, blue, and green to 64 and 0, respectively.

According to an exemplary embodiment of the present invention, because various colors can be expressed without changing a voltage that is applied to red LED, green LED, and blue LED light sources, in various application fields using visible light communication, intuitive information can be provided through various colors.

An exemplary embodiment of the present invention may be not only embodied through the above-described apparatus and/or method but also embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting data in a transmitting apparatus using visible light communication, the method comprising:
   receiving a color index and a luminance index of the color;
   determining an LED that emits a color having a largest ratio from among ratios of the plurality of light emitting diodes (LEDs) for expressing a color associated with the color index and the luminance index;
   determining a pattern index of the LED that emits a color having the largest ratio according to the luminance index;
   determining pattern indexes of the remaining LEDs according to the ratios of the plurality of LEDs;
   generating a light source control signal according to the pattern index of the LED that emits a color having the largest ratio and the pattern indexes of the remaining LEDs; and;
   controlling an on/off time of a light source comprising a plurality of LEDs according to the light source control signal to transmit the data using the visible light communication.

2. The method of claim 1, wherein
   the plurality of LEDs comprise at least a red LED, a green LED, and a blue LED.

3. The method of claim 2, wherein the generating of a light source control signal comprises generating light source control signals of the red LED, the green LED, and the blue LED from ratios of red, green, and blue, respectively, for expressing the color.

4. The method of claim 3, wherein voltages that turn on the red LED, the green LED, and the blue LED according to light source control signals of the red LED, the green LED, and the blue LED are equal.

5. The method of claim 1, further comprising:
   receiving transmission data from an upper-level layer;
   generating a modulation signal by modulating the transmission data; and
   controlling the light source according to the modulation signal.

6. A transmitting apparatus using visible light communication, the transmitting apparatus comprising:
   a light source comprising a plurality of light emitting diodes (LEDs);

a color generator configured to:
- receive a color index and a luminance index of the color;
- determine an LED that emits a color having a largest ratio from among ratios of the plurality of light emitting diodes (LEDs) for expressing a color associated with the color index and the luminance index;
- determine a pattern index of the LED that emits a color having the largest ratio according to the luminance index; and
- determine pattern indexes of the remaining LEDs according to the ratios of the plurality of LEDs;

a color processor that generates a light source control signal according to the pattern index of the LED that emits a color having the largest ratio and the pattern indexes of the remaining LEDs; and a light source driver that controls an on/off time of the plurality of LEDs according to the light source control signal to transmit information using the visible light communication.

7. The transmitting apparatus of claim 6, wherein the plurality of LEDs comprise at least a red LED, a green LED, and a blue LED.

8. The transmitting apparatus of claim 6, wherein voltages that turn on the red LED, the green LED, and the blue LED according to light source control signals of the red LED, the green LED, and the blue LED are equal.

9. The transmitting apparatus of claim 6, further comprising:
- a data processor that receives transmission data from an upper-level layer; and
- a modulation unit that generates a modulation signal by modulating transmission data and that transfers the modulation signal to the light source driver,
- wherein the light source driver controls the light source according to the modulation signal.

* * * * *